United States Patent
Lee et al.

(10) Patent No.: US 12,147,202 B2
(45) Date of Patent: Nov. 19, 2024

(54) GRADUAL PIXEL APERTURE DESIGN FOR IMPROVED VISUALIZATION AT A SENSOR LOCATION OF AN ELECTRONICS DISPLAY

(71) Applicant: Google LLC, Mountain View, CA (US)

(72) Inventors: Choongho Lee, San Diego, CA (US); Triton Hurd, Encinitas, CA (US)

(73) Assignee: GOOGLE LLC, Mountain View, CA (US)

( * ) Notice: Subject to any disclaimer, the term of this patent is extended or adjusted under 35 U.S.C. 154(b) by 425 days.

(21) Appl. No.: 17/552,360

(22) Filed: Dec. 16, 2021

(65) Prior Publication Data
US 2023/0195046 A1    Jun. 22, 2023

(51) Int. Cl.
| G04G 21/02 | (2010.01) |
| G04G 9/00 | (2006.01) |
| G04G 21/08 | (2010.01) |
| G06F 3/01 | (2006.01) |
| G09G 3/20 | (2006.01) |

(52) U.S. Cl.
CPC ........... *G04G 21/025* (2013.01); *G04G 9/007* (2013.01); *G06F 3/011* (2013.01); *G04G 21/08* (2013.01); *G09G 3/2003* (2013.01); *G09G 2300/0452* (2013.01)

(58) Field of Classification Search
CPC ......... G09G 2300/0452; G09G 3/2003; G04G 21/08; G04G 21/025; G04G 9/007; G04G 9/0064; G06F 3/011
See application file for complete search history.

(56) References Cited

U.S. PATENT DOCUMENTS

| 2019/0310724 A1* | 10/2019 | Yeke Yazdandoost | ...................... H10K 59/121 |
| 2021/0126078 A1* | 4/2021 | Lee | .......... H10K 59/60 |
| 2021/0151425 A1* | 5/2021 | Kim | ...................... H04N 23/51 |

FOREIGN PATENT DOCUMENTS

CN    110993633 A    4/2020

OTHER PUBLICATIONS

Joseph, "[Updated] Explained: Under Display Cameras & its Application with the CEO of OTI Lumionics", Gizmochina.com, https://www.gizmochina.com/2020/09/10/under-display-camera-oled-development-application-future/, Sep. 10, 2020, 23 pages.
Vasan, "Oppo under-screen camera showcased with better display integrity", Smartprix.com, https://www.smartprix.com/bytes/oppo-under-screen-camera-phone-prototype/, Aug. 4, 2021, 5 pages.

* cited by examiner

*Primary Examiner* — Muhammad N Edun
(74) *Attorney, Agent, or Firm* — DORITY & MANNING P.A.

(57) ABSTRACT

A computing device includes a pixelated electronic display having a substrate and a plurality of pixels arranged thereon. The plurality of pixels includes, at least, a first portion of pixels and a second portion of pixels. The second portion of pixels has a gradually varying pixel aperture size. The computing device also includes at least one sensor positioned under the pixelated electronic display and adjacent to the second portion of pixels having the gradually varying pixel aperture size and at least one processor communicatively coupled to the at least one sensor for controlling the computing device.

20 Claims, 5 Drawing Sheets

GRADUAL PIXEL APERTURE DESIGN FOR IMPROVED VISUALIZATION AT A SENSOR LOCATION OF AN ELECTRONICS DISPLAY

FIELD

The present disclosure relates generally to wearable computing devices, and more particularly, to a gradual pixel aperture design for improved visualization at a sensor location of an electronics display.

BACKGROUND

Recent advances in technology, including those available through consumer devices, have provided for corresponding advances in personal health detection and monitoring. For example, devices such as fitness trackers and smart watches are able to determine information relating to the pulse or motion of a person wearing the device. Due to capabilities of conventional devices, however, the amount and types of health information able to be determined using such devices has been limited.

Recent advances in sensor, electronics, and power source miniaturization have allowed the size of personal health monitoring devices, also referred to herein as "biometric tracking" or "biometric monitoring" devices, to be offered in extremely small sizes that were previously impractical. Further, such devices typically include a pixelated display, battery, sensors, wireless communications capability, power source, and various interface buttons. Larger devices, such as tablets, smart phones, computers, etc. also have similar pixelated displays, batteries, sensors, wireless communications capability, power source, and various interface buttons as well.

For modern devices, display pixel design adopts two different pixel densities for the sensor area. For example, the sensor under the display requires a higher transmission than remaining display areas for image sensitivity. The different pixel densities, however, can cause the boundary of the sensor to be visible. The display panel for the sensor there below usually applies two regions, i.e., one for lower pixel density and the other for the high pixel density. Again, however, this design causes the sensor boundary to be visible. To solve this, modern devices attempt to manipulate the pixel density around the sensor area. However, as mentioned, the difference in the pixel density creates an undesirable visual effect.

Accordingly, the present disclosure is directed to a wearable computing device, or any other suitable device having a pixelated display, in which pixel aperture is adjusted rather than the pixel density. In particular, in an embodiment, the wearable biometric monitoring device includes a pixel aperture that decreases gradually from a certain baseline (e.g., the aperture ratio of the regular active area) to zero which creates a miniature "hole" for the image sensors that is not easily viewed by end users.

SUMMARY

Aspects and advantages of embodiments of the present disclosure will be set forth in part in the following description, or can be learned from the description, or can be learned through practice of the embodiments.

One example aspect of the present disclosure is directed to a wearable computing device. The wearable computing device includes an outer covering, a housing, and a pixelated electronic display arranged within the housing and viewable through the outer covering. The pixelated electronic display includes a substrate and a plurality of pixels arranged thereon. The plurality of pixels includes, at least, a first portion of pixels and a second portion of pixels. The substrate may have a first portion on which the first portion of pixels is arranged and a second portion on which the second portion of pixels is arranged. The second portion of pixels (or the second portion of the substrate) has a gradually varying pixel aperture size. The wearable computing device also includes at least one sensor positioned under the pixelated electronic display and adjacent to the second portion of pixels having the gradually varying pixel aperture size and at least one processor communicatively coupled to the at least one sensor for controlling the wearable computing device.

In another aspect, the present disclosure is directed to a computing device. The computing device includes a pixelated electronic display having a substrate and a plurality of pixels arranged thereon. The plurality of pixels includes, at least, a first portion of pixels and a second portion of pixels. The second portion of pixels has a gradually varying pixel aperture size. The computing device also includes at least one sensor positioned under the pixelated electronic display and adjacent to the second portion of pixels having the gradually varying pixel aperture size and at least one processor communicatively coupled to the at least one sensor for controlling the computing device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
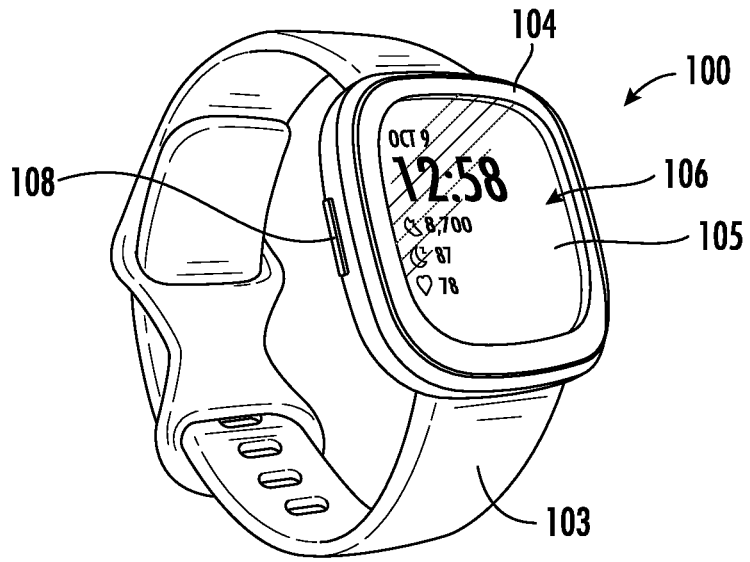
FIG. 1 provides a front perspective view of a wearable computing device according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Recent advances in sensor, electronics, and power source miniaturization have allowed the size of personal health monitoring devices, also referred to herein as "biometric tracking" or "biometric monitoring" devices, to be offered in extremely small sizes that were previously impractical. Further, such devices typically include a pixelated display, battery, sensors, wireless communications capability, power source, and various interface buttons. Larger devices, such as tablets, smart phones, computers, etc. also have similar pixelated displays, batteries, sensors, wireless communications capability, power source, and various interface buttons as well.

For modern devices, display pixel design adopts two different pixel densities for the sensor area. For example, the sensor under or adjacent to the pixelated display requires a higher transmission than remaining display areas for image sensitivity. The different pixel densities, however, can cause the boundary of the sensor to be visible, thereby causing an desirable outline on the screen that is visible to a user. Thus, the display panel for the sensor there below usually applies two regions, i.e., one for lower pixel density and the other for the high pixel density. Again, however, this design causes the sensor boundary to be visible. To solve this, modern devices have attempted to manipulate the pixel density around the sensor area. However, as mentioned, the difference in the pixel density creates an undesirable visual effect.

Accordingly, the present disclosure is directed to a wearable computing device, or any other suitable device having a pixelated display, in which pixel aperture is adjusted rather than the pixel density. In particular, in an embodiment, the computing device includes a pixel aperture that decreases gradually from a certain baseline (e.g., the aperture ratio of the regular active area) to zero which creates a miniature "hole" for the image sensors that is not easily viewed by end users.

With reference now to the Figures, example embodiments of the present disclosure will be discussed in further detail.

Example Devices and Systems

Figure 2:
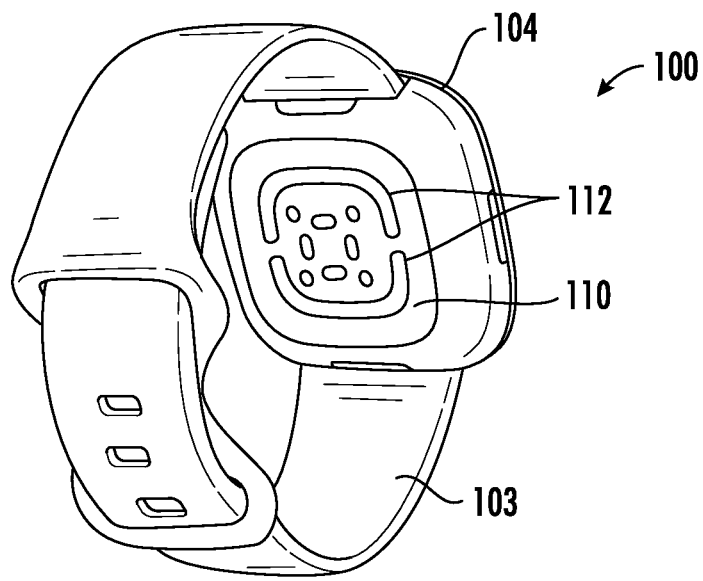
FIG. 2 provides a rear perspective view of the wearable computing device of FIG. 3.
Figure 3:
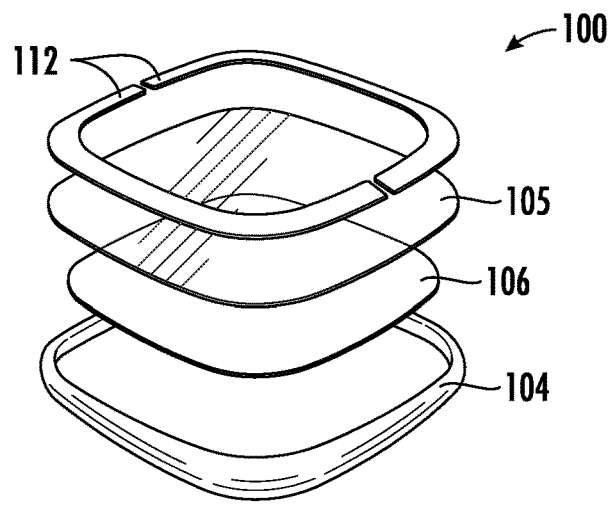
FIG. 3 provides an exploded view of the display of the wearable computing device of FIG. 3.

Referring now to the drawings, FIGS. 1-5 illustrate various views of a wearable computing device 100 according to the present disclosure. In particular, as shown in FIG. 1, the wearable computing device 100 may be worn on a user's forearm 102 like a wristwatch. Thus, as shown, the wearable computing device 100 may include a wristband 103 for securing the wearable computing device 100 to the user's forearm 102. In addition, as shown in FIGS. 1 and 3, the wearable computing device 100 has an outer covering 105 and a housing 104 that contains the electronics associated with the wearable computing device 100. For example, in an embodiment, the outer covering 105 may be constructed of glass, polycarbonate, acrylic, or similar. Further, as shown in FIGS. 1 and 3, the wearable computing device 100 includes a pixelated electronic display 106 arranged within the housing 104 and viewable through the outer covering 105. Moreover, as shown in FIG. 1, the wearable computing device 100 may also include one or more buttons 108 that may be implemented to provide a mechanism to activate various sensors of the wearing computing device 100 to collect certain health data of the user. In addition, in an embodiment, the electronic display 106 may cover an electronics package (not shown), which may also be housed within the housing 104.

Referring particularly to FIG. 2, the housing 104 of the wearable computing device 100 may include a dorsal wrist-side face 110 configured to sit against a dorsal wrist of a user when being worn by the user and a plurality of sensors 112 positioned on the dorsal wrist-side face 110 of the housing 104 so as to maintain skin contact with the user when being worn on the wrist by the user. Thus, in such embodiments, each of the sensors 112 is configured to measure various biometric parameters of the user. Further sensors may also be located within the housing 104 and may include, for example, an image sensor, a biometric sensor, a fingerprint sensor, a temperature sensor, a humidity sensor, a light sensor, a pressure sensor, a microphone, a photoplethysmogram (PPG) sensor, or an electrodermal activity (EDA) sensor.

Figure 4:
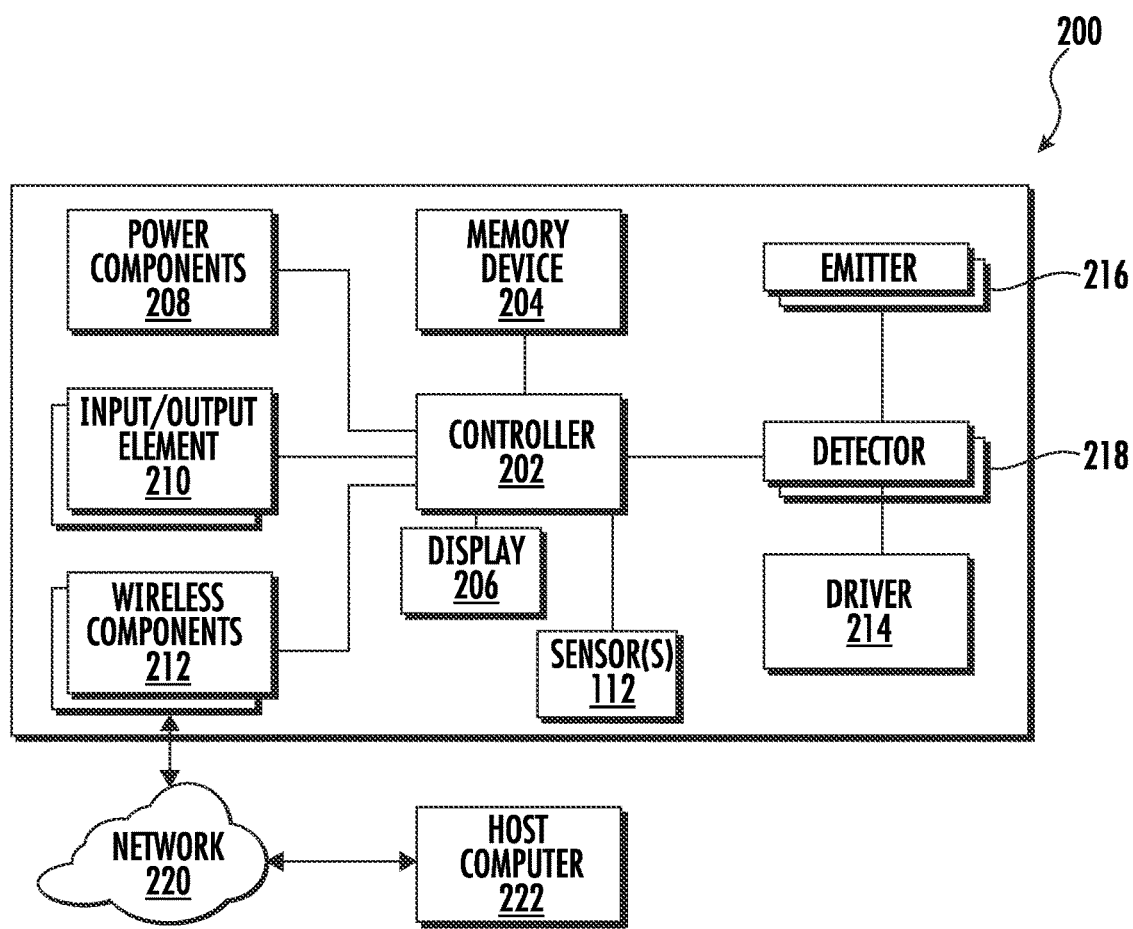
FIG. 4 provides a schematic diagram of an example set of devices that are able to communicate according to one embodiment of the present disclosure.

Referring now to FIG. 4, components of an example computing system 200 of the wearable computing device 100 that can be utilized in accordance with various embodiments are illustrated. In particular, as shown, the system 200 may also include at least one controller 202 communicatively coupled to the sensor(s) 112 described herein. Moreover, in an embodiment, the controller(s) 202 may be a central processing unit (CPU) or graphics processing unit (GPU) for executing instructions that can be stored in a memory device 204, such as flash memory or DRAM, among other such options. For example, in an embodiment, the memory device 204 may include RAM, ROM, FLASH memory, or other non-transitory digital data storage, and may include a control program comprising sequences of instructions which, when loaded from the memory device 204 and executed using the controller(s) 202, cause the controller(s) 202 to perform the functions that are described herein.

As would be apparent to one of ordinary skill in the art, the system 200 can include many types of memory, data storage, or computer-readable media, such as data storage for program instructions for execution by the controller or any suitable processor. The same or separate storage can be used for images or data, a removable memory can be available for sharing information with other devices, and any number of communication approaches can be available for sharing with other devices. In addition, as shown, the system 200 includes the electronics pixelated display 106, which may be a touch screen, organic light emitting diode (OLED), or liquid crystal display (LCD), although devices might convey information via other means, such as through audio speakers, projectors, or casting the display or streaming data to another device, such as a mobile phone, wherein an application on the mobile phone displays the data.

The system 200 may also include one or more wireless components 212 operable to communicate with one or more electronic devices within a communication range of the particular wireless channel. The wireless channel can be any appropriate channel used to enable devices to communicate wirelessly, such as Bluetooth, cellular, NFC, Ultra-Wideband (UWB), or Wi-Fi channels. It should be understood that the system 200 can have one or more conventional wired communications connections as known in the art.

The system 200 also includes one or more power components 208, such as may include a battery operable to be recharged through conventional plug-in approaches, or through other approaches such as capacitive charging through proximity with a power mat or other such device. In further embodiments, the system 200 can also include at least one additional I/O device 210 able to receive conventional input from a user. This conventional input can include, for example, a push button, touch pad, touch screen, wheel, joystick, keyboard, mouse, keypad, or any other such device or element whereby a user can input a command to the system 200. In another embodiment, the I/O device(s) 210 may be connected by a wireless infrared or Bluetooth or other link as well in some embodiments. In some embodiments, the system 200 may also include a microphone or other audio capture element that accepts voice or other audio commands. For example, in particular embodiments, the system 200 may not include any buttons at all, but might be controlled only through a combination of visual and audio commands, such that a user can control the wearable computing device 100 without having to be in contact therewith. In certain embodiments, the I/O elements 210 may also include one or more of the sensor(s) 112 described herein, optical sensors, barometric sensors (e.g., altimeter, etc.), and the like.

Still referring to FIG. 4, the system 200 may also include a driver 214 and at least some combination of one or more emitters 216 and one or more detectors 218 for measuring data for one or more metrics of a human body, such as for a person wearing the wearable computing device 100. In some embodiments, for example, this may involve at least one imaging element, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Further image capture elements may also include depth sensors. Methods for capturing images using a camera element with a computing device are well known in the art and will not be discussed herein in detail. It should be understood that image capture can be performed using a single image, multiple images, periodic imaging, continuous image capturing, image streaming, etc. Further, the system 200 can include the ability to start and/or stop image capture, such as when receiving a command from a user, application, or other device.

The emitters 216 and detectors 218 of FIG. 4 may also be capable of being used, in one example, for obtaining optical photoplethysmogram (PPG) measurements. Some PPG technologies rely on detecting light at a single spatial location, or adding signals taken from two or more spatial locations. Both of these approaches result in a single spatial measurement from which the heart rate (HR) estimate (or other physiological metrics) can be determined. In some embodiments, a PPG device employs a single light source coupled to a single detector (i.e., a single light path). Alternatively, a PPG device may employ multiple light sources coupled to a single detector or multiple detectors (i.e., two or more light paths). In other embodiments, a PPG device employs multiple detectors coupled to a single light source or multiple light sources (i.e., two or more light paths). In some cases, the light source(s) may be configured to emit one or more of green, red, infrared (IR) light, as well as any other suitable wavelengths in the spectrum (such as long IR for metabolic monitoring). For example, a PPG device may employ a single light source and two or more light detectors each configured to detect a specific wavelength or wavelength range. In some cases, each detector is configured to detect a different wavelength or wavelength range from one another. In other cases, two or more detectors are configured to detect the same wavelength or wavelength range. In yet another case, one or more detectors configured to detect a specific wavelength or wavelength range different from one or more other detectors). In embodiments employing multiple light paths, the PPG device may determine an average of the signals resulting from the multiple light paths before determining an HR estimate or other physiological metrics.

Moreover, in an embodiment, the emitters 216 and detectors 218 may be coupled to the controller 202 directly or indirectly using driver circuitry by which the controller 202 may drive the emitters 216 and obtain signals from the detectors 218. The host computer 222 can communicate with the wireless networking components 212 via the one or more networks 220, which may include one or more local area networks, wide area networks, UWB, and/or internetworks using any of terrestrial or satellite links. In some embodiments, the host computer 222 executes control programs and/or application programs that are configured to perform some of the functions described herein.

Figure 5:
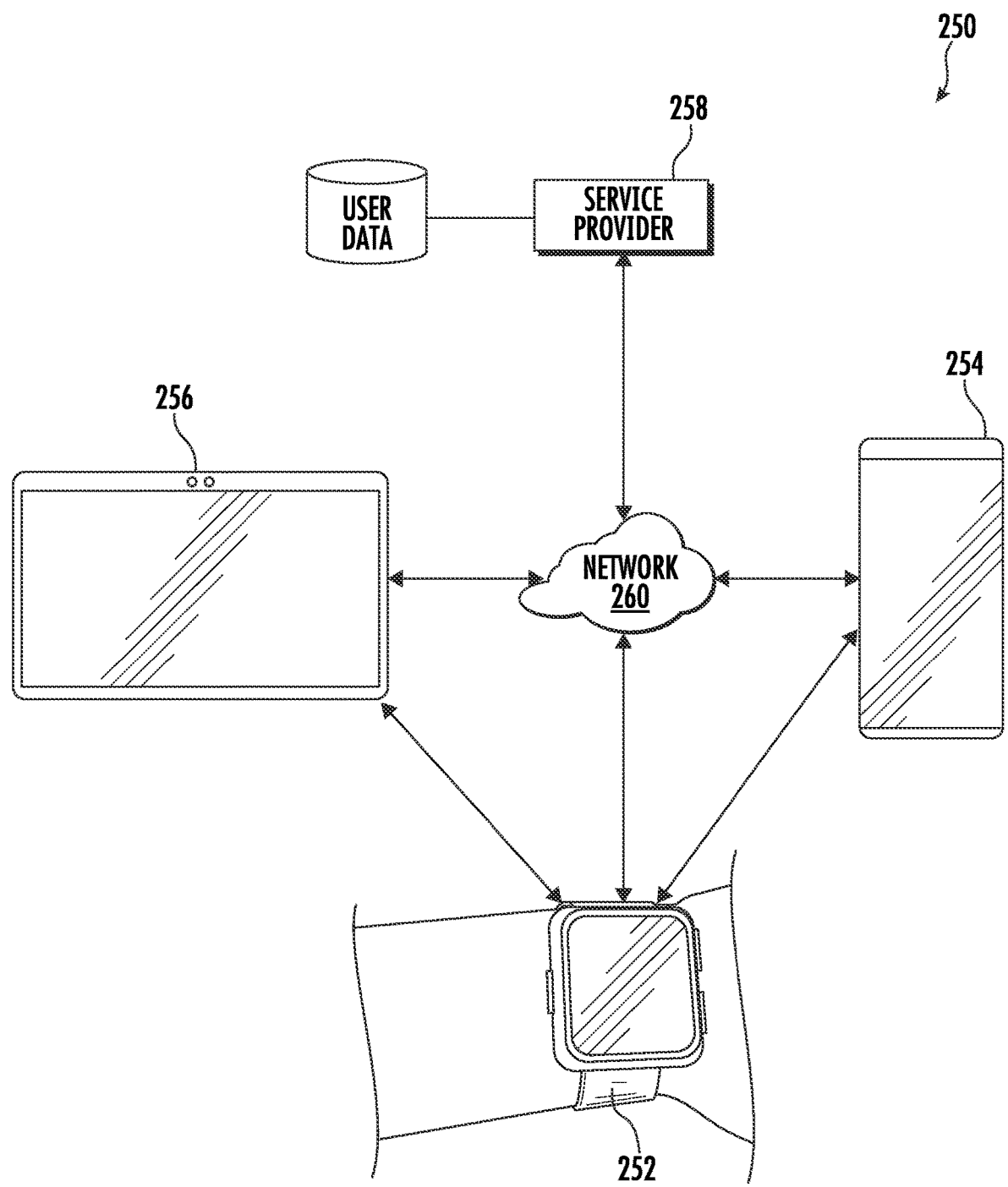
FIG. 5 illustrates various controller components of an example system that can be utilized according to one embodiment of the present disclosure.

Referring now to FIG. 5, a schematic diagram of an environment 250 in which aspects of various embodiments can be implemented is illustrated. In particular, as shown, a user might have a number of different devices that are able to communicate using at least one wireless communication protocol. For example, as shown, the user might have a smartwatch 252 or fitness tracker (such as wearable computing device 100), which the user would like to be able to communicate with a smartphone 254 and a tablet computer 256. The ability to communicate with multiple devices can enable a user to obtain information from the smartwatch 252, e.g., data captured using a sensor on the smartwatch 252, using an application installed on either the smartphone 254 or the tablet computer 256. The user may also want the smartwatch 252 to be able to communicate with a service provider 258, or other such entity, that is able to obtain and process data from the smartwatch and provide functionality that may not otherwise be available on the smartwatch or the applications installed on the individual devices. In addition, as shown, the smartwatch 252 may be able to communicate with the service provider 258 through at least one network 260, such as the Internet or a cellular network, or may communicate over a wireless connection such as Bluetooth® to one of the individual devices, which can then communicate over the at least one network. There may be a number of other types of, or reasons for, communications in various embodiments.

In addition to being able to communicate, a user may also want the devices to be able to communicate in a number of ways or with certain aspects. For example, the user may want communications between the devices to be secure, particularly where the data may include personal health data or other such communications. The device or application providers may also be required to secure this information in at least some situations. The user may want the devices to be able to communicate with each other concurrently, rather than sequentially. This may be particularly true where pairing may be required, as the user may prefer that each device be paired at most once, such that no manual pairing is required. The user may also desire the communications to be as standards-based as possible, not only so that little manual intervention is required on the part of the user but also so that the devices can communicate with as many other types of devices as possible, which is often not the case for various proprietary formats. A user may thus desire to be able to walk in a room with one device and have such device automatically communicate with another target device with little to no effort on the part of the user. In various conventional approaches, a device will utilize a communication technology such as Wi-Fi to communicate with other devices using wireless local area networking (WLAN). Smaller or lower capacity devices, such as many Internet of Things (IoT) devices, instead utilize a communication technology such as Bluetooth®, and in particular Bluetooth Low Energy (BLE) which has very low power consumption.

In further embodiments, the environment 300 illustrated in FIG. 5 enables data to be captured, processed, and displayed in a number of different ways. For example, data may be captured using sensors on the smartwatch 252, but due to limited resources on the smartwatch 252, the data may be transferred to the smartphone 254 or the service provider 258 (or a cloud resource) for processing, and results of that processing may then be presented back to that user on the smartwatch 252, smartphone 254, and/or another such device associated with that user, such as the tablet computer 256. In at least some embodiments, a user may also be able to provide input such as health data using an interface on any of these devices, which can then be considered when making that determination.

Referring now to FIGS. 6-11, various views of multiple embodiments of a computing device having a pixelated electronic display 300 according to the present disclosure are illustrated. In particular, as mentioned and shown in FIG. 3, the pixelated electronic display 300 may be the pixelated electronic display 106 described herein, which is arranged within the housing 104 and viewable through the outer covering 105 of the wearable computing device 100. In other embodiments, the pixelated electronic display 300 may be part of a tablet, smart phone, computer, etc. or similar.

Moreover, as shown in FIGS. 6-11, the pixelated electronic display 300 includes a substrate 302 and a plurality of pixels 304 arranged thereon. Furthermore, as shown particularly in FIGS. 6 and 9, the plurality of pixels 304 may include, at least, a first portion of pixels 306 and a second portion of pixels 308. In addition, as shown in FIGS. 6-11, the second portion 308 of pixels has a gradually varying pixel aperture size. In particular, with respect to FIG. 6, the gradually varying pixel aperture size generally refers to the spacing between each of the pixels 304 gradually varying across the substrate 302. In the illustrated embodiment, for example, the pixel aperture size in the area labeled 300 ppi is less than a pixel aperture size in the area labeled 200 ppi and so on. Moreover, the term "gradual" is understood to mean that the varying pixel aperture size is small enough so as to not be visible to a user when viewing the pixelated electronic display 300.

It should be noted that a "pixel" of the electronic display 300 as described herein may be regarded to be the smallest addressable imaging element of the electronic display 300. Further, it should be understood that the "pixel aperture size" may be defined as the effective light emitting area of the electronic display or a pixel.

Thus, according to an embodiment, a size of at least some of the plurality of first and second pixels may be equal. As used herein, the "size" of a pixel generally refers to its width measured parallel to the substrate 302 of the display 300. If the size of at least some of the plurality of first and second pixels is equal, the number of pixels per substrate area may change gradually from the portion of the display (e.g., of the substrate) that includes the first portion 306 of pixels towards a location (e.g., a center) of the portion of the display (e.g., of the substrate) that includes the second portion 308 of pixels.

According to another embodiment, the pixel density of the first and second portions 306, 308 of pixels may be equal, i.e., the pixel density in the portion of the substrate that includes the first portion 306 of pixels and the pixel density in the portion of the display that includes the second portion 306 of pixels may be essentially the same. In that case, a size of at least some of the plurality of second pixels may gradually decrease from a size of the plurality of first pixels. For example, the size of at least some of the plurality of second pixels gradually decreases from the portion of the display 300 (e.g., of the substrate) that includes the first portion 306 of pixels towards a location (e.g., a center) of the portion of the display (e.g., of the substrate) that includes the second portion 308 of pixels. Furthermore, in an embodiment, the size of the plurality of second pixels may decrease to zero at the location on the substrate.

Still referring to FIGS. 6-11, the computing device may include at least one sensor 310 positioned under the pixelated electronic display 300 and adjacent to the second portion 308 of pixels having a gradually varying pixel aperture size (i.e., on an opposing side of the second portion 308 of pixels). Thus, the gradually varying pixel aperture sizes are configured to provide a higher transmission than remaining display areas for image sensitivity relating to the sensor 310. In particular, as mentioned, the sensor 310 may be the sensor(s) 112 described herein and may be an image sensor, a biometric sensor, a fingerprint sensor, a temperature sensor, a humidity sensor, a light sensor, a pressure sensor, a microphone, a photoplethysmogram (PPG) sensor, an electrodermal activity (EDA) sensor, or any other suitable sensor.

Thus, similar to the system 200 described with respect to FIG. 4, the computing device may include at least one processor communicatively coupled to the sensor 310 for controlling the computing device. For example, in an embodiment, the processor may be part of the controller 202 of the wearable computing device described herein. In other embodiments, the processor may be part of a tablet, smart phone, computer, etc. or similar.

Figure 6:
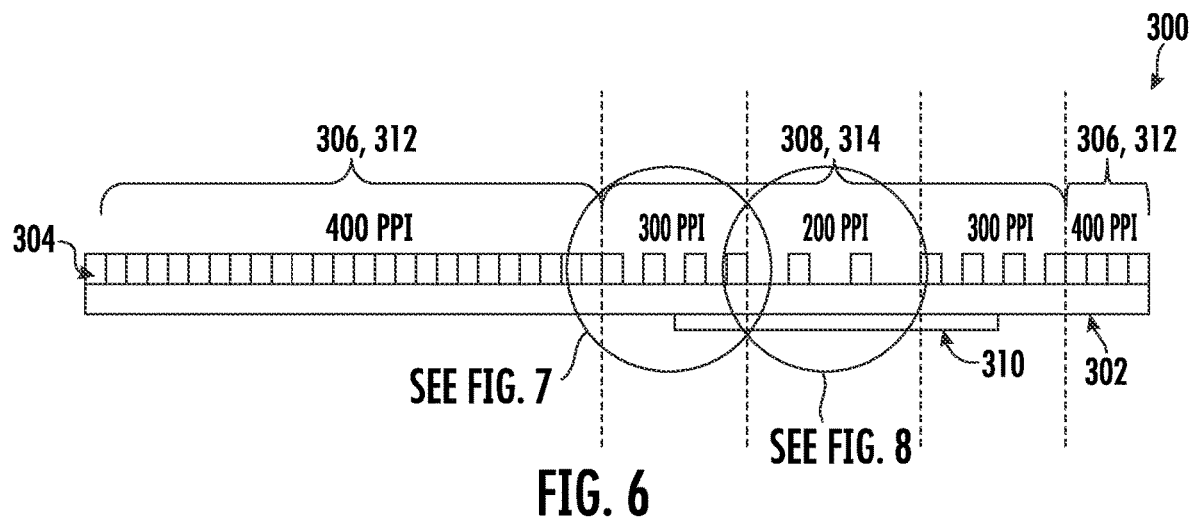
FIG. 6 provides a side view of a pixelated electronic display of a wearable computing device according to one embodiment of the present disclosure.
Figure 7:
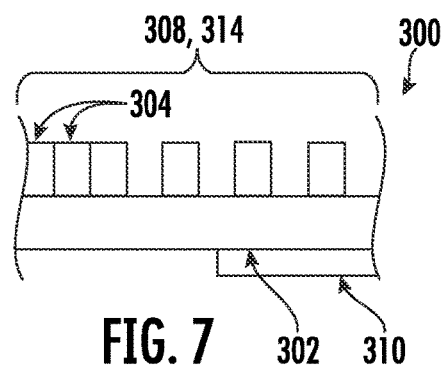
FIG. 7 provides a detailed view of a portion of the pixelated electronic display of FIG. 6.
Figure 8:
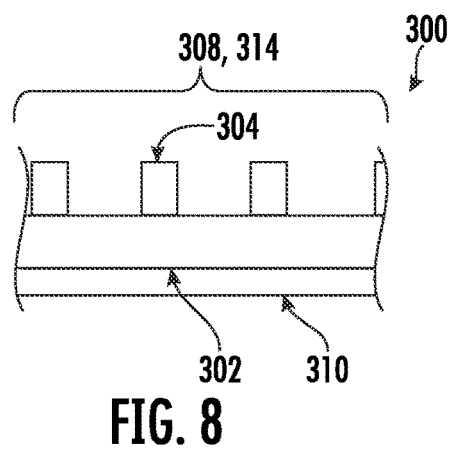
FIG. 8 provides a detailed view of another portion of the pixelated electronic display of FIG. 6.

Referring back to FIGS. 6-11, the first portion of pixels 306 may include a plurality of first pixels 312 and the second portion 308 of pixels may include a plurality of second pixels 314. Thus, as shown in the embodiment of FIGS. 6-8, a size of the plurality of first and second pixels 312, 314 are equal, i.e., across both first and second portions of pixels 306, 308. In such embodiments, a number of the plurality of second pixels 314 in the second portion 308 of pixels is less than a number of the plurality of first pixels 312 in the first portion 306 of pixels so as to define the gradually varying pixel aperture size.

More specifically, as shown in FIG. 7, the pixel size may be the same, but the number of pixels (per substrate area)

may decrease, such as by using three-fourths (¾) of the number of pixels per substrate area in the second portion 308 of pixels (a second portion of the electronic display 300) as compared to the first portion 306 of pixels (a first portion of the electronic display 300). In another embodiment, as shown in FIG. 8, the pixel size may be the same, but the number of pixels per area may decrease, such as by using one half (½) of the number of pixels in the second portion 308 of pixels as compared to the first portion 306 of pixels. Moreover, as shown in FIG. 6, in an embodiment, a step change in pixel density of the second portion 308 of pixels may be equal to or less than about 100 pixels per inch (ppi) so as to define the gradually varying pixel aperture size.

Figure 9:
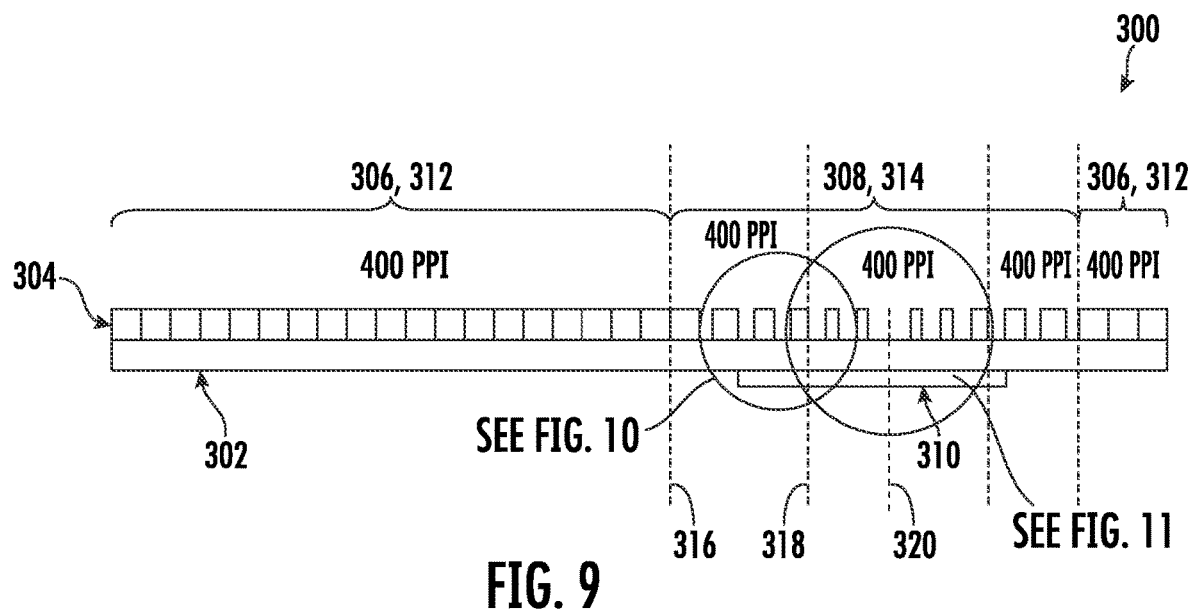
FIG. 9 provides a side view of a pixelated electronic display of a wearable computing device according to another embodiment of the present disclosure.
Figure 10:
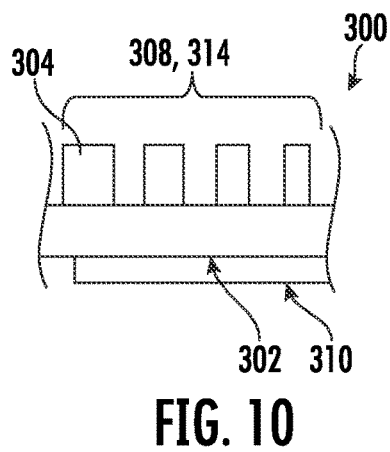
FIG. 10 provides a detailed view of a portion of the pixelated electronic display of FIG. 9.
Figure 11:
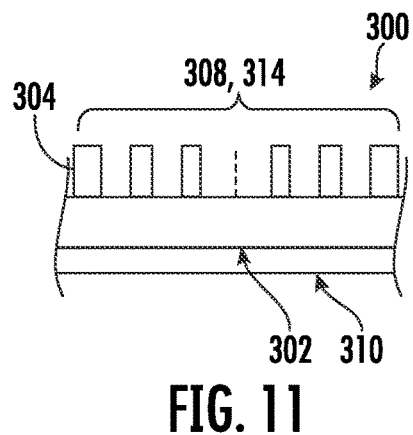
FIG. 11 provides a detailed view of another portion of the pixelated electronic display of FIG. 9.

Referring now to the embodiment of FIGS. 9-11, a pixel density of the first and second portions 306, 308 of pixels may be equal, i.e., across both the first and second portions of pixels 306, 308. For example, in the illustrated embodiment, the pixel density of the first and second portions 306, 308 may be equal to or less than about 400 ppi. It should be understood that the illustrated pixel density is provided for illustrative purposes only and is not intended to be limiting. Thus, those of ordinary skill in the art would understand that the pixel density may be more than 400 ppi or less than 400 ppi.

Furthermore, in such embodiments, in which the pixel density of the first and second portions 306, 308 of pixels is equal, a size of the plurality of second pixels 314 gradually decreases from a size of the plurality of first pixels 312, the size being the width or diameter of a pixel measured parallel to a surface of the display 300. For example, as shown at dotted line 316 in FIG. 9, the size of the plurality of second pixels 314 begins to gradually decrease from a size of the plurality of first pixels 312. Then, as shown at dotted line 318, the size of the plurality of second pixels 314 continues to gradually decrease from dotted line 316. In other words, with each section, the size of the plurality of second pixels 314 decreases by another step change amount (e.g., by half and then half again and so on). Thus, as shown, in an embodiment, the size of the plurality of second pixels 314 continues to decrease in this manner until the size of the pixels is equal to zero at a location 320 on the substrate 302. More specifically, as shown in FIG. 9, the location 320 on the substrate 302 may be a center location within the second portion 308 of pixels, which may also be a center location of the sensor 310. Thus, in each of the illustrated embodiments, the gradually varying pixel aperture size is not visible to a user of the computing device. In the embodiment of FIGS. 9-11, the gradually varying pixel aperture size corresponds to the size of the pixels.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present disclosure has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A wearable computing device, comprising:
an outer covering;
a housing;
a pixelated electronic display arranged within the housing and viewable through the outer covering, the pixelated electronic display comprising a substrate and a plurality of pixels arranged thereon, the plurality of pixels comprising, at least, a first portion of pixels and a second portion of pixels, the second portion of pixels having a gradually varying pixel aperture size;
at least one sensor positioned under the pixelated electronic display and adjacent to the second portion of pixels having the gradually varying pixel aperture size; and
at least one processor communicatively coupled to the at least one sensor for controlling the wearable computing device.

2. The wearable computing device of claim 1, wherein the first portion of pixels comprises a plurality of first pixels and the second portion of pixels comprises a plurality of second pixels.

3. The wearable computing device of claim 2, wherein a size of the plurality of first and second pixels are equal.

4. The wearable computing device of claim 3, wherein a number of the plurality of second pixels in the second portion of pixels is less than a number of the plurality of first pixels in the first portion of pixels so as to define the gradually varying pixel aperture size.

5. The wearable computing device of claim 4, wherein a step change in pixel density of the second portion of pixels is equal to or less than about 100 pixels per inch (ppi) so as to define the gradually varying pixel aperture size.

6. The wearable computing device of claim 2, wherein a pixel density of the first and second portions of pixels are equal.

7. The wearable computing device of claim 6, wherein a size of the plurality of second pixels gradually decreases from a size of the plurality of first pixels.

8. The wearable computing device of claim 7, wherein the size of the plurality of second pixels decreases to zero at a location on the substrate.

9. The wearable computing device of claim 8, wherein the location on the substrate is a center location of the second portion of pixels.

10. The wearable computing device of claim 1, wherein a pixel density of the first portion of pixels is equal to or less than about 400 pixels per inch (ppi).

11. The wearable computing device of claim 1, wherein the at least one sensor comprises at least one of an image sensor, a biometric sensor, a fingerprint sensor, a temperature sensor, a humidity sensor, a light sensor, a pressure sensor, a microphone, a photoplethysmogram (PPG) sensor, or an electrodermal activity (EDA) sensor.

12. The wearable computing device of claim 1, wherein the gradually varying pixel aperture size is not visible to a user of the wearable computing device.

13. A computing device, comprising:
- a pixelated electronic display comprising a substrate and a plurality of pixels arranged thereon, the plurality of pixels comprising, at least, a first portion of pixels and a second portion of pixels, the second portion of pixels having a gradually varying pixel aperture size;
- at least one sensor positioned under the pixelated electronic display and adjacent to the second portion of pixels having the gradually varying pixel aperture size; and
- at least one processor communicatively coupled to the at least one sensor for controlling the computing device.

14. The computing device of claim 13, wherein the first portion of pixels comprises a plurality of first pixels and the second portion of pixels comprises a plurality of second pixels.

15. The computing device of claim 14, wherein a size of the plurality of first and second pixels are equal.

16. The computing device of claim 15, wherein a number of the plurality of second pixels in the second portion of pixels is less than a number of the plurality of first pixels in the first portion of pixels so as to define the gradually varying pixel aperture size.

17. The computing device of claim 16, wherein a step change in pixel density of the second portion of pixels is equal to or less than about 100 pixels per inch (ppi) so as to define the gradually varying pixel aperture size.

18. The computing device of claim 14, wherein a pixel density of the first and second portions of pixels are equal.

19. The computing device of claim 18, wherein a size of the plurality of second pixels gradually decreases from a size of the plurality of first pixels.

20. The computing device of claim 19, wherein the size of the plurality of second pixels decreases to zero at a location on the substrate, the location on the substrate being a center location within the second portion of pixels.

* * * * *